United States Patent
Noyes et al.

(10) Patent No.: US 12,529,019 B2
(45) Date of Patent: Jan. 20, 2026

(54) REACTOR CLEANING PROCESS AND COMPOSITION

(71) Applicant: G-3 Chickadee Purchaser, LLC, Akron, OH (US)

(72) Inventors: Kelsey Elizabeth Noyes, Canton, OH (US); Margaret Flook Vielhaber, Kent, OH (US)

(73) Assignee: G-3 Chickadee Purchaser, LLC, Akron, OH (US)

( * ) Notice: Subject to any disclaimer, the term of this patent is extended or adjusted under 35 U.S.C. 154(b) by 589 days.

(21) Appl. No.: 17/937,513

(22) Filed: Oct. 3, 2022

(65) Prior Publication Data
US 2024/0124809 A1    Apr. 18, 2024

(51) Int. Cl.
| | |
|---|---|
| C11D 7/26 | (2006.01) |
| C08F 2/00 | (2006.01) |
| C08F 36/06 | (2006.01) |
| C11D 7/32 | (2006.01) |

(52) U.S. Cl.
CPC ............ *C11D 7/261* (2013.01); *C08F 2/008* (2013.01); *C08F 36/06* (2013.01); *C11D 7/263* (2013.01); *C11D 7/3218* (2013.01); *C11D 2111/20* (2024.01)

(58) Field of Classification Search
None
See application file for complete search history.

(56) References Cited

U.S. PATENT DOCUMENTS

| | | | |
|---|---|---|---|
| 5,278,305 A | 1/1994 | Kelsey | |
| 5,446,102 A * | 8/1995 | Oziomek | ............... C08C 19/08 525/313 |
| 5,728,917 A | 3/1998 | Grubbs et al. | |
| 5,831,108 A | 11/1998 | Grubbs et al. | |
| 7,132,503 B2 | 11/2006 | Pawlow et al. | |
| 7,294,717 B2 | 11/2007 | Herrmann et al. | |
| 2005/0026797 A1* | 2/2005 | Pawlow | ................. C08C 19/08 510/188 |
| 2020/0362273 A1 | 11/2020 | Joe et al. | |

(Continued)

FOREIGN PATENT DOCUMENTS

| | | |
|---|---|---|
| EP | 3838932 A1 | 6/2021 |
| EP | 3 919 522 A1 | 12/2021 |

(Continued)

OTHER PUBLICATIONS

Dinger M B et al, Degradation of the First-Generation Grubbs, Organometallics, vol. 22, No. 5, 1089-1095, Mar. 3, 2003 (Mar. 3, 2003), American Chemical Society.

(Continued)

*Primary Examiner* — Satya B Sastri
(74) *Attorney, Agent, or Firm* — Jackson Walker LLP; Leisa Talbert Peschel

(57) ABSTRACT

A process of cleaning a reactor includes providing an alcohol-containing material to the reactor; and providing a metathesis catalyst to the reactor. The reactor contains a high molecular weight polymer gel and an organoaluminum material. The alcohol-containing material is not an alkyl tartrate and may be selected from triisopropanolamine, 4-tert-butylcatechol, isopropanol, and phenol formaldehyde resins.

15 Claims, 2 Drawing Sheets

(56) References Cited

U.S. PATENT DOCUMENTS

2021/0189040 A1 6/2021 Spilker
2022/0162351 A1 5/2022 Lee et al.

FOREIGN PATENT DOCUMENTS

KR 2021 0124629 A 10/2021
WO 2005012367 A1 2/2005

OTHER PUBLICATIONS

Grant S Forman et al, A Convenient System for Improving the Efficiency of First-Generation Ruthenium Olefin Metathesis Catalysts, Organometallics, vol. 24, No. 19, 4528-4542, Sep. 1, 2005 (Sep. 1, 2005), American Chemical Society.
Santos Alexandra G et al, Overcoming Catalyst Decomposition in Acrylate Metathesis: Polyphenol Resins as Enabling Agents for PCy3-Stabilized Metathesis Catalysts, ACS Catalysis, vol. 7, No. 5, 3181-3189, Apr. 9, 2017 (Apr. 9, 2017), American Chemical Society.
Yu Baoqiu et al, Robust Biological Hydrogen-Bonded Organic Framework with Post-Functionalized Rhenium(I) Sites for Efficient Heterogeneous Visible-Light-Driven CO2 Reduction, CO2 Reduction, vol. 60, No. 16, 8983-8989, Mar. 9, 2021 (Mar. 9, 2021), Angewandte Chemie International Edition.
Extended European Search Report for Application No. 23201127.0, dated Feb. 27, 2024.
European Office Action—Communication pursuant to Article 94(3) EPC, dated Sep. 30, 2025.

\* cited by examiner

REACTOR CLEANING PROCESS AND COMPOSITION

BACKGROUND

The exemplary embodiment relates to a process for cleaning a reactor.

Neodymium, nickel, and titanium-catalyzed polymerizations commonly use organoaluminum species (e.g., alkyl aluminum species such as trialkyl aluminum) in the polymerization process. During polymerization, it is well-known that high molecular weight gel, or fouling, will develop in the reactors. The organoaluminum species can remain as residuals in this gel, acting as a poison for ruthenium-centered metathesis catalysts, which are commonly used in the depolymerization process during reactor cleaning.

European Pat. Pub. No. EP 3919522 A1 published Dec. 8, 2021, entitled CATALYST COMPOSITION, CLEANING LIQUID COMPOSITION COMPRISING SAME, AND METHOD FOR CLEANING POLYMERIZATION DEVICE BY USING SAME, to Lee, et al., describes catalyst compositions containing a dialkyl L-tartrate. It was reported in EP3919522A1 that dialkyl L-tartrate can be used to chelate residual aluminum, thus preventing the aluminum from acting as a poison for reactor cleaning catalysts. The alkyl L-tartrate described in EP3919522A1 is successful in decreasing molecular weight by depolymerizing polymer, with increasing loadings of the tartrate leading to lower molecular weights. However, it is an ill-suited choice for use in polymerization equipment.

There remains a need for reactor cleaning compositions and processes which enable high polymer recovery and avoid catalyst poisoning.

BRIEF DESCRIPTION

Disclosed, in some embodiments, is a process of cleaning a reactor containing a high molecular weight polymer gel and an organoaluminum material. The process includes providing an alcohol-containing material to the reactor; and providing a metathesis catalyst to the reactor. The alcohol-containing material is not an alkyl tartrate.

The alcohol-containing material may be provided to the reactor before the metathesis catalyst, or the alcohol-containing material and the metathesis catalyst can be provided to the reactor in the same composition.

In some embodiments, the alcohol-containing material is selected from the group consisting of triisopropanolamine, 4-tert-butylcatechol, isopropanol, and phenol formaldehyde resins.

The alcohol-containing material may be provided to the reactor in an amount of from about 1 to about 1000 mol per mol of organoaluminum material in the reactor.

In some embodiments, the alcohol-containing material is provided at least about 10 minutes prior to the metathesis catalyst.

In other embodiments, the alcohol-containing material is provided at least about 20 minutes prior to the metathesis catalyst.

The metathesis catalyst is provided in an amount of about 0.1 to about 25 grams per gallon of fouling.

In some embodiments, the alcohol-containing material is a polymer or a catechol compound.

The process may further include recovering polymer after the alcohol-containing material and the metathesis catalyst are provided.

In some embodiments, the recovered polymer has a number average molecular weight ($M_n$) in a range of about 10,000 to about 100,000 g/mol.

The process may recover at least about 60% of the polymer, at least about 80% of the polymer, or at least about 90% of the polymer.

Disclosed, in other embodiments, is a reactor cleaning composition containing: an alcohol-containing material and a metathesis catalyst. The alcohol-containing material is not an alkyl tartrate.

The alcohol-containing material may be selected from the group consisting of triisopropanolamine, 4-tert-butylcatechol, isopropanol, and phenol formaldehyde resins.

Disclosed, in further embodiments, is a polymerization and reactor cleaning process including in sequence: polymerizing at least one monomer in the presence of a catalyst system comprising an organoaluminum compound; providing an alcohol-containing material to the reactor; providing a ruthenium-containing metathesis catalyst to the reactor; and recovering a polymer from the reactor.

The alcohol-containing material may be selected from the group consisting of triisopropanolamine, 4-tert-butylcatechol, isopropanol, and phenol formaldehyde resins.

In some embodiments, the alcohol-containing material is provided to the reactor in an amount of from about 1 to about 1000 mol per mol of organoaluminum material in the reactor.

The recovered polymer may have a number average molecular weight ($M_n$) in a range of about 10,000 to about 100,000 g/mol; and the process may recover at least about 60% of the polymer.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
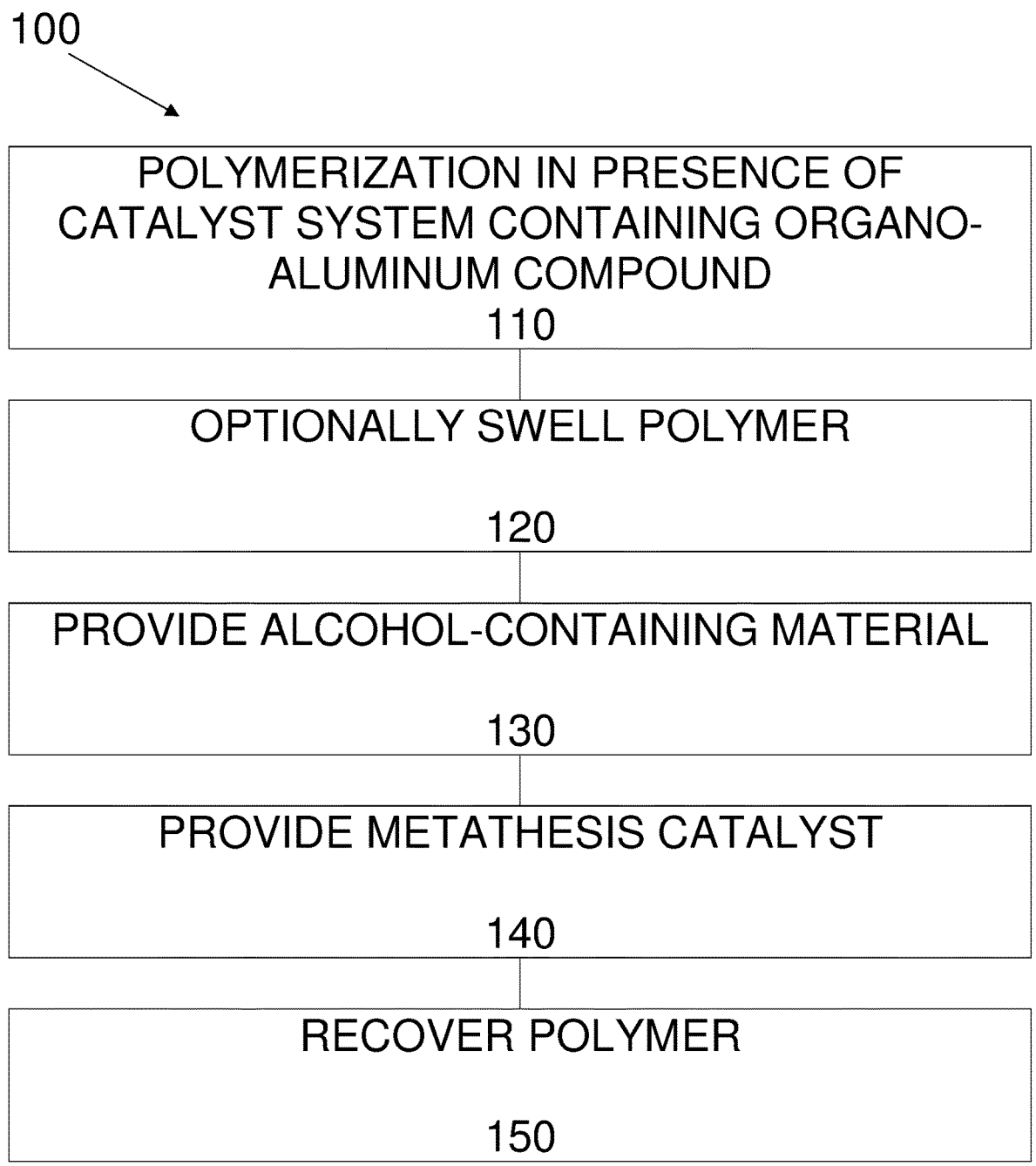
FIG. 1 is a flow chart illustrating a non-limiting example of a process in accordance with some embodiments of the present disclosure.

The present disclosure may be understood more readily by reference to the following detailed description of desired embodiments included therein and the drawings. In the following specification and the claims which follow, reference will be made to a number of terms which shall be defined to have the following meanings.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent can be used in practice or testing of the present disclosure. All publications, patent applications, patents, and other references mentioned herein are incorporated by reference in their entirety. The materials, methods, and articles disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases that require the presence of the named ingredients/steps and permit the presence of other ingredients/steps. However, such description should be construed as also describing compositions, mixtures, or processes as "consisting of" and "consisting essentially of" the enumerated ingredients/steps, which allows the presence of only the named ingredients/steps, along with any impurities that might result therefrom, and excludes other ingredients/steps.

Unless indicated to the contrary, the numerical values in the specification should be understood to include numerical values which are the same when reduced to the same number of significant figures and numerical values which differ from the stated value by less than the experimental error of the conventional measurement technique of the type used to determine the particular value.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

A system, composition, and method are described for cleaning a reactor. Use of the alcohol-containing materials disclosed herein for reactor cleaning provides equal or improved molecular weight decreases, while improving upon the polymer recovery versus alkyl L-tartrate.

FIG. 1 illustrates a non-limiting example of a polymerization and reactor cleaning process 100 in accordance with some embodiments of the present disclosure. The process 100 includes polymerization in the presence of a catalyst system containing an organoaluminum compound 110, optionally swelling the polymer 120, providing an alcohol-containing material to chelate residual aluminum 130, introducing a metathesis catalyst 140, and recovering the polymer 150. It should be understood that not all steps are required, and the steps need not be performed in this particular order. Moreover, two or more of the above steps may be combined.

Polymerization 110 may be solution polymerization in the presence of a lanthanide-based polymerization catalyst. Suitable catalysts may include lanthanide catalysts based on cerium, praseodymium, neodymium, or gadolinium. In one embodiment, the lanthanide-based polymerization catalyst is neodymium catalyst system. Such polymerizations may be conducted in a hydrocarbon solvent that can be one or more aromatic, paraffinic, or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, normal hexane, benzene, toluene, xylene, ethylbenzene, and the like, alone or in admixture.

The neodymium catalyst system may be made by preforming three catalyst components. These components are (1) an organoaluminum compound, (2) a neodymium carboxylate, and (3) a dialkyl aluminum chloride. In making the neodymium catalyst system, the neodymium carboxylate and the organoaluminum compound may be first reacted together for 10 minutes to 30 minutes in the presence of isoprene to produce a neodymium-aluminum catalyst component. The neodymium carboxylate and the organoaluminum compound are preferably reacted for 12 minutes to 30 minutes and are more preferably reacted for 15 to 25 minutes in producing the neodymium-aluminum catalyst component.

The neodymium-aluminum catalyst component is then reacted with the dialkyl aluminum chloride for a period of at least 30 minutes to produce the neodymium catalyst system. The activity of the neodymium catalyst system normally improves as the time allowed for this step is increased up to about 24 hours. Greater catalyst activity is not normally attained by increasing the aging time over 24 hours. However, the catalyst system may be aged for much longer time periods before being used without detrimental results.

The neodymium catalyst system will typically be prepared at a temperature that is within the range of about 0° C. to about 100° C. The neodymium catalyst system will more typically be prepared at a temperature that is within the range of about 10° C. to about 60° C. The neodymium catalyst system may be prepared at a temperature that is within the range of about 15° C. to about 30° C.

The organoaluminum compound contains at least one carbon to aluminum bond and can be represented by the structural formula:

in which $R_1$ is selected from the group consisting of alkyl (including cycloalkyl), alkoxy, aryl, alkaryl, arylalkyl radicals and hydrogen; $R_2$ is selected from the group consisting of alkyl (including cycloalkyl), aryl, alkaryl, arylalkyl radicals, and hydrogen; and $R_3$ is selected from a group consisting of alkyl (including cycloalkyl), aryl, alkaryl, and arylalkyl radicals. Non-limiting examples of suitable organoaluminum compounds include: diethylaluminum hydride, di-n-propylaluminum hydride, di-n-butylaluminum hydride, diisobutylaluminum hydride, diphenylaluminum hydride, di-p-tolylaluminum hydride, dibenzylaluminum hydride, phenylethylaluminum hydride, phenyl-n-propylaluminum hydride, p-tolylethylaluminum hydride, p-tolyl-n-propylaluminum hydride, p-tolylisopropylaluminum hydride, benzylethylaluminum hydride, benzyl-n-propylaluminum hydride, and benzylisopropylaluminum hydride and other organoaluminum hydrides. Also included are ethylaluminum dihydride, butylaluminum dihydride, isobutylaluminum dihydride, octylaluminum dihydride, amylaluminum dihydride, and other organoaluminum dihydrides. Also included are diethylaluminum ethoxide and dipropylaluminum ethoxide. Also included are trimethylaluminum, triethylaluminum, tri-n-propylaluminum, triisopropylaluminum, tri-n-propylaluminum, triisopropylaluminum, tri-n-butylaluminum, triisobutylaluminum, tripentylaluminum, trihexylaluminum, tricyclohexylaluminum, trioctylaluminum, triphenylaluminum, tri-p-tolylaluminum, tribenzylaluminum, ethyldiphenylaluminum, ethyl-di-p-tolylaluminum, ethyldibenzylaluminum, diethylphenylaluminum, diethyl-p-tolylaluminum, diethylbenzylaluminum, and other triorganoaluminum compounds.

The neodymium carboxylate may utilize an organic monocarboxylic acid ligand that contains from 1 to 20 carbon atoms, such as acetic acid, propionic acid, valeric acid, hexanoic acid, 2-ethylhexanoic acid, neodecanoic acid, lauric acid, stearic acid and the like. Non-limiting examples include neodymium versatate, neodymium naphthenate, neodymium neodecanoate, neodymium octanoate, and other neodymium metal complexes with carboxylic acid containing ligands having from 1 to 20 carbon atoms.

The proportions of the catalyst components utilized in making the neodymium catalyst system can be varied widely. The atomic ratio of the halide ion to the neodymium metal can vary from about 0.1:1 to about 6:1, including from about 0.5:1 to about 3.5:1, and about 2:1. The molar ratio of the trialkylaluminum or alkylaluminum hydride to neodymium metal can range from about 4:1 to about 200:1, including from about 8:1 to about 100:1. The molar ratio of monomer to neodymium metal can range from about 0.2:1 to 3000:1, including from about 5:1 to about 500:1.

The amount of catalyst used to initiate the polymerization can be varied over a wide range. Low concentrations of the catalyst system are normally desirable in order to minimize ash problems. The amount of neodymium metal may be between 0.05 and 1.0 millimole of neodymium metal per 100 grams of monomer. In some embodiments, the amount is between 0.1 and 0.3 millimole of neodymium metal per 100 grams of monomer.

The concentration of the total catalyst system employed of depends upon factors such as purity of the system, polymerization rate desired, temperature and other factors. A person having ordinary skill in the art is aware of these factors and can select suitable concentrations (i.e., effective catalytic amounts).

Temperatures at which the polymerization reaction is carried out can be varied over a wide range. Usually, the temperature can be varied from extremely low temperatures such as −60° C. up to high temperatures, such as 150° C. or higher. In some embodiments, the reaction occurs at a temperature in the range of from about 10° C. to about 90° C. The pressure at which the polymerization is carried out can also be varied over a wide range. The reaction can be conducted at atmospheric pressure or, if desired, it can be carried out at sub-atmospheric or super-atmospheric pressure. Generally, a satisfactory polymerization is obtained when the reaction is carried out at about autogenous pressure, developed by the reactants under the operating conditions used.

Many types of unsaturated monomers which contain carbon-carbon double bonds can be polymerized into polymers using such metal catalysts. Elastomeric or rubbery polymers can be synthesized by polymerizing diene monomers utilizing this type of metal initiator system. The diene monomers that can be polymerized into synthetic rubbery polymers can be either conjugated or nonconjugated diolefins. Conjugated diolefin monomers containing from 4 to 8 carbon atoms are generally preferred. Vinyl-substituted aromatic monomers can also be copolymerized with one or more diene monomers into rubbery polymers, for example styrene-butadiene rubber (SBR). Some representative examples of conjugated diene monomers that can be polymerized into rubbery polymers include 1,3-butadiene, isoprene, 1,3-pentadiene, 2,3-dimethyl-1,3-butadiene, 2-methyl1,3-pentadiene, 2,3-dimethyl-1,3-pentadiene, 2-phenyl-1,3-butadiene, and 4,5-diethyl-1,3-octadiene. Some representative examples of vinyl-substituted aromatic monomers that can be utilized in the synthesis of rubbery polymers include styrene, 1-vinylnapthalene, 3-methylstyrene, 3,5-diethylstyrene, 4-propylstyrene, 2,4,6-trimethylstyrene, 4-dodecylstyrene, 3-methyl-5-normal-hexylstyrene, 4-phenylstyrene, 2-ethyl-4-benzylstyrene, 3,5-diphenylstyrene, 2,3,4,5-tetraethylstyrene, 3-ethyl-1-vinylnapthalene, 6-isopropyl-1-vinylnapthalene, 6-cyclohexyl-1-vinylnapthalene, 7-dodecyl-2-vinylnapthalene, α-methylstyrene, and the like.

The process 100 may further include swelling 120 the polymer (e.g., diene-based polymer) in the polymerization apparatus with a hydrocarbon-based solvent. The hydrocarbon-based solvent may be an aliphatic hydrocarbon-based solvent (e.g., normal hexane, cyclohexane) or an aromatic hydrocarbon-based solvent (e.g., benzene, toluene, ethylbenzene, xylene). Swelling may or may not be a specific, separate step. In some embodiments, residual fouling is inherently swollen from the solvent environment.

Swelling 120 may be performed at 20° C. to 100° C., or 20° C. to 80° C., and within the above range, the swelling of the polymer accumulated in the polymerization apparatus may be maximized.

An alcohol-containing material is provided 130 to the reactor. In some embodiments, the alcohol is not a tartrate, not an alkyl tartrate, and/or not a dialkyl L-tartrate. The alcohol may be a polyol. In some embodiments, the polyol is a diol, a triol, or a tetrol. Non-limiting examples of suitable alcohols include:

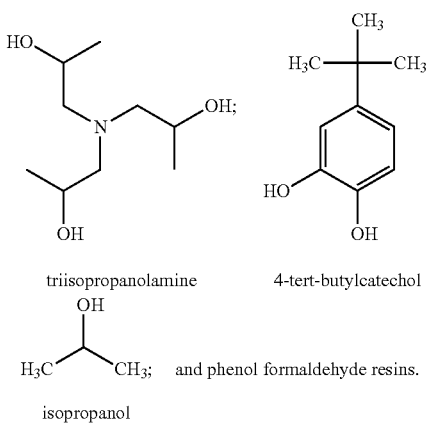

triisopropanolamine     4-tert-butylcatechol isopropanol     and phenol formaldehyde resins.

The phenol formaldehyde resin may be the reaction product of 4-nonylphenol, formaldehyde, and dodecane-1-thiol.

A ratio of the amount of the alcohol-containing material to the amount of the organoaluminum material in the reactor may be in a range of about 1 to about 1000 moles alcohol per mole organoaluminum, including from about 10 to about 200 moles alcohol per mole organoaluminum and from about 1 to about 10 moles alcohol per mole organoaluminum.

A metathesis catalyst is provided 140 to the reactor. Non-limiting examples of metathesis catalysts are disclosed in U.S. Pat. Nos. 5,728,917, 5,831,108, 7,132,503, and 7,294,717; and U.S. Pat. Pub. Nos. 2020/0362273 and 2022/0162351. The contents of these patents and publications are incorporated by reference herein in their entireties. The metathesis catalyst decomposes a higher molecular weight polymer into a lower molecular weight polymer and/or oligomer.

The metathesis catalyst may be a ruthenium or osmium carbene compound. In some embodiments, the metathesis catalyst is a first-generation Grubbs catalyst, a second-generation Grubbs catalyst, a third generation Grubbs catalyst, or a Hoveyda-Grubbs catalyst.

The catalyst composition may include one or more transition metal compounds of Formula 1 and Formula 3:

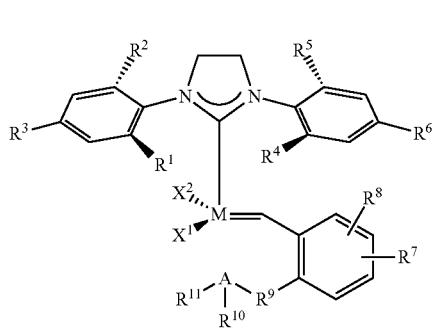

(Formula 1)

wherein M is ruthenium or osmium, A is oxygen (O), nitrogen (N), or sulfur (S), and if A is oxygen (O) or sulfur (S), any one of $R^{10}$ and $R^{11}$ does not exist, $X^1$ and $X^2$ are each independently halogen, $R^1$, $R^2$, $R^3$, $R^4$, $R^5$, and $R^6$ are each independently hydrogen or an alkyl group having 1 to 10 carbon atoms, $R^7$ and $R^8$ are each independently hydrogen or an electron withdrawing group, $R^9$ is a direct bond or an alkylene group having 1 to 10 carbon atoms, and $R^{10}$ and $R^{11}$ are each independently an alkyl group having 1 to 10 carbon atoms or a substituent represented by the following Formula 2,

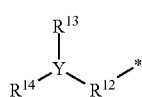

(Formula 2)

wherein Y is oxygen (O), nitrogen (N), or sulfur (S), and if Y is oxygen (O) or sulfur (S), any one of $R^{13}$ and $R^{14}$ does not exist, $R^{12}$ is an alkylene group having 1 to 10 carbon atoms, a cycloalkylene group having 3 to 10 carbon atoms, or an arylene group having 6 to 10 carbon atoms, $R^{13}$ and $R^{14}$ are each independently hydrogen, an alkyl group having 1 to 10 carbon atoms, or a cycloalkyl group having 3 to 10 carbon atoms, and * represents a bonding position with A,

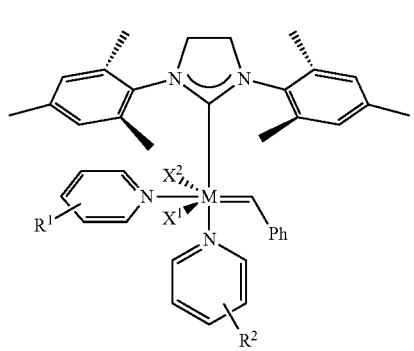

(Formula 3)

wherein M is ruthenium or osmium, $R^1$ and $R^2$ are each independently hydrogen or a substituent represented by the following Formula 4, and at least one is a substituent represented by the following Formula 4, $X^1$ and $X^2$ are each independently halogen, and Ph is a phenyl group, and

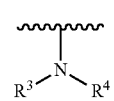

(Formula 4)

wherein $R^3$ and $R^4$ are each independently an alkyl group having 1 to 10 carbon atoms; or $R^3$ and $R^4$ are linked together to form a saturated or unsaturated 5-membered ring.

The metathesis catalyst may be provided in a solution (i.e., dissolved in a solvent). In some embodiments, the solvent is a hydrocarbon solvent (e.g., an aromatic hydrocarbon solvent). Non-limiting examples of hydrocarbon solvents include benzene, toluene, ethylbenzene, xylene, and the like.

The metathesis catalyst may be provided in an amount of about 0.1 to about 25 grams per gallon of fouling, including from about 0.5 to about 5 grams per gallon and about 1 to about 2.5 grams per gallon.

The polymer is recovered 150 from the reactor. Although the Examples below refer to using gel permeation chromatography (GPC) for polymer recovery, it should be understood that the claims refer to polymer that is precipitated and isolated by conventional polymer finishing conditions (i.e., stripper, expeller, expander, drying) rather than GPC recovery.

Figure 2:
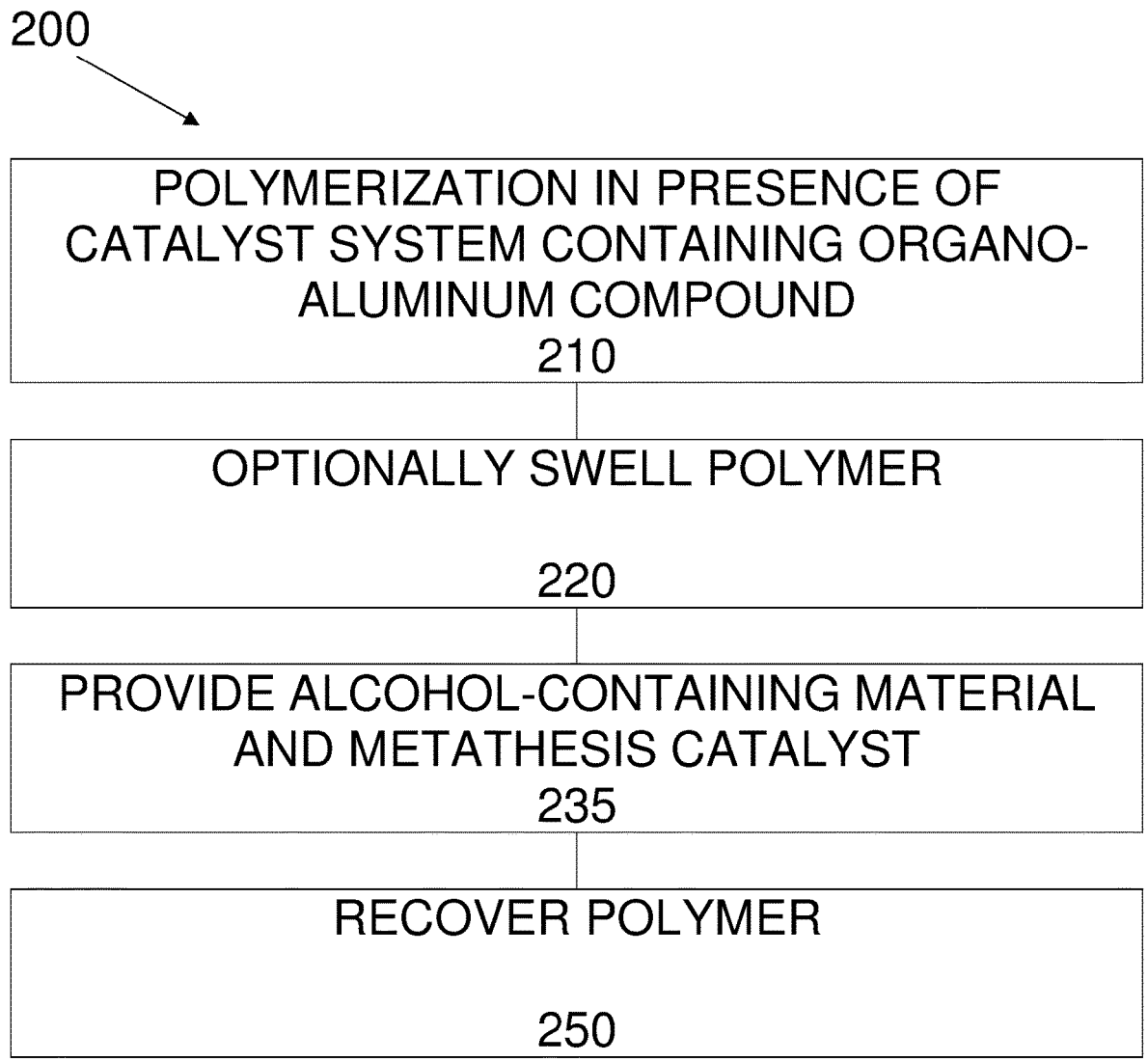
FIG. 2 is a flow chart illustrating another non-limiting example of a process in accordance with some embodiments of the present disclosure.

FIG. 2 illustrates another non-limiting example of a polymerization and reactor cleaning process 200 in accordance with some embodiments of the present disclosure. The process 200 includes polymerization in the presence of a catalyst system containing an organoaluminum compound 210, optionally swelling the polymer 220, providing an alcohol-containing material and a metathesis catalyst 235, and recovering the polymer 250. This process differs from the process illustrated in FIG. 1 because the alcohol-containing material and the metathesis catalyst are provided in the same composition.

The following examples are provided to illustrate the devices and methods of the present disclosure. The examples are merely illustrative and are not intended to limit the disclosure to the materials, conditions, or process parameters set forth therein.

EXAMPLES

All examples were analyzed by GPC to determine the degree of molecular weight degradation and to determine the polymer recovery, as an indicator of insoluble fraction.

Example 1

Synthesis of Live Nd-Cement

High molecular weight neodymium polybutadiene was synthesized in glass bottles, in hexane, between 50-80° C. The neodymium catalyst was made via procedures well-known in the art from neodymium versatate, dialkylaluminum chloride, and trialkylaluminum. The monomer premix was treated with excess trialkylaluminum prior to addition of the neodymium catalyst solution. The volume of the excess trialkylaluminum was determined according to the desired target polymer.

Example 2

Synthesis of Controls

Two polymer types were made—one with high loading of trialkylaluminum (A) and one with low loading of trialkylaluminum (B). These controls were made by allowing the monomer premix to react with the neodymium catalyst for 90 minutes before quenching with isopropanol.

Example 3

Synthesis of Negative Controls

Polymer A and Polymer B were synthesized according to the process described in Example 2, except that 3.5 ppm of Grubbs' catalyst solution in ethylbenzene was added to the live cement and allowed to react for 90 minutes. This can be done in the presence or absence of an additional olefin source. After this time, the Grubbs' catalyst was quenched with a vinyl ether, followed by an isopropanol quench to ensure no live trialkylaluminum remained. The isopropanol was added to quench any potential residual live aluminum after the depolymerization step was complete.

Example 4

Synthesis of Samples 1-9

Polymers A and B for Samples 1-9 were synthesized according to the process described in Example 3, except a chosen alcohol-containing material was added to the live cement and reacted for 30 minutes prior to addition of 3.5 ppm of Grubbs' catalyst solution.

Results/Discussion

The diethyl L-tartrate competitive examples 7A, 8A, 7B, and 8B show a significant decrease in molecular weight for both 1 eq and 10 eq of tartrate used. However, when examining the percent recovery, which indicates how much polymer remained soluble, an inverse relationship was observed between tartrate loading and percent recovery. This trend is consistent for both polymers A and B. This low percent recovery is an undesirable trait for the reactor cleaning process.

For the remaining Samples 1-6 and 9, it was observed that 4-t-butylcatechol (TBC, Samples 1A, 2A, 1B, and 2B) exhibits the best combination of molecular weight degradation and percent recovery for both 1 eq and 10 eq in both polymers A and B. Although POLYSTAY® K (PSK, Samples 5A, 6A, 5B, and 6B) did not show molecular weight reduction at 1 eq, it was more successful than diethyl L-tartrate and comparable to TBC at 10 eq. Triisopropanolamine (TIPA, Samples 3A, 4A, 3B, and 4B) exhibited excellent molecular weight reduction, but surprisingly inconsistent percent recovery, making it only marginally better than diethyl L-tartrate. Finally, isopropanol (ISOL, Samples 9A and 9B) showed excellent molecular weight reduction and good percent recovery, making it better than diethyl L-tartrate, but slightly deficient compared to TBC or 10 eq PSK.

There is a much wider variety of alcohols, diols, and polyols that can be chosen as alkylaluminum-containing reactor fouling treatment agents. This also allows for process improvement by reducing the number of unique alcohols needed at a polymer production plant. It also allows for fewer individual chemicals to be included in the final, finished profile of the resulting liquid polymers or their blends.

| Sample | Polymer | Alcohol | Alcohol Eq (vs Al) | Grubbs (ppm) | Mn | % Recovery |
|---|---|---|---|---|---|---|
| Control A | A | None | 0 | 0 | 503400 | 51 |
| Negative Control A | A | None | 0 | 3.5 | 242700 | 45 |
| 1A | A | TBC | 1 | 3.5 | 92450 | 100 |
| 2A | A | TBC | 10 | 3.5 | 53780 | 100 |
| 3A | A | TIPA | 1 | 3.5 | 52280 | 33 |
| 4A | A | TIPA | 10 | 3.5 | 12420 | 55 |
| 5A | A | PSK | 1 | 3.5 | 629900 | 62 |
| 6A | A | PSK | 10 | 3.5 | 92370 | 100 |
| Competitive Example 7A | A | Tartrate | 1 | 3.5 | 76000 | 79 |
| Competitive Example 8A | A | Tartrate | 10 | 3.5 | 55350 | 33 |
| 9A | A | ISOL | 10 | 3.5 | 69480 | 79 |
| Control B | B | None | 0 | 0 | 436400 | 43 |
| Negative Control B | B | None | 0 | 3.5 | 238500 | 28 |
| 1B | B | TBC | 1 | 3.5 | 52330 | 100 |
| 2B | B | TBC | 10 | 3.5 | 47940 | 100 |
| 3B | B | TIPA | 1 | 3.5 | 57920 | 49 |
| 4B | B | TIPA | 10 | 3.5 | 146300 | 100 |
| 5B | B | PSK | 1 | 3.5 | 414500 | 98 |
| 6B | B | PSK | 10 | 3.5 | 111200 | 100 |
| Competitive Example 7B | B | Tartrate | 1 | 3.5 | 52170 | 85 |
| Competitive Example 8B | B | Tartrate | 10 | 3.5 | 39810 | 41 |
| 9B | B | ISOL | 10 | 3.5 | 40160 | 100 |

This written description uses examples to describe the disclosure, including the best mode, and also to enable any person skilled in the art to make and use the disclosure. Other examples that occur to those skilled in the art are intended to be within the scope of the present disclosure if they have structural elements that do not differ from the same concept, or if they include equivalent structural elements with insubstantial differences. It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

We claim:

1. A process of cleaning a reactor containing a polymer gel and an organoaluminum material, the process comprising:
   providing an alcohol-containing material to the reactor in an amount of from about 1 to about 1000 mol per mol of the organoaluminum material; and
   providing a metathesis catalyst to the reactor;
   wherein the alcohol-containing material is not an alkyl tartrate.

2. The process of claim 1, wherein the alcohol-containing material is provided to the reactor before the metathesis catalyst.

3. The process of claim 1, wherein the alcohol-containing material and the metathesis catalyst are provided to the reactor in the same composition.

4. The process of claim 1, wherein the alcohol-containing material is selected from the group consisting of triisopropanolamine, 4-tert-butylcatechol, isopropanol, and phenol formaldehyde resins.

5. The process of claim 1, wherein the alcohol-containing material is provided at least about 10 minutes prior to the metathesis catalyst.

6. The process of claim 1, wherein the alcohol-containing material is provided at least about 20 minutes prior to the metathesis catalyst.

7. The process of claim 1, wherein the metathesis catalyst is provided in an amount of about 0.1 to about 25 grams per gallon of fouling.

8. A process of cleaning a reactor containing a polymer gel and an organoaluminum material, the process comprising:
   providing an alcohol-containing material to the reactor; and
   providing a metathesis catalyst to the reactor;
   wherein the alcohol-containing material is not an alkyl tartrate, wherein the alcohol-containing material is selected from a polymer or a catechol compound.

9. The process of claim 1, further comprising:
   recovering polymer after the alcohol-containing material and the metathesis catalyst are provided.

10. The process of claim 9, wherein the recovered polymer has a number average molecular weight ($M_n$) in a range of about 10,000 to about 100,000 g/mol.

11. The process of claim 9, wherein the process recovers about 60% to about 90% of the polymer by weight.

12. A polymerization and reactor cleaning process comprising in sequence:
    polymerizing at least one monomer in the presence of a catalyst system comprising an organoaluminum compound;
    providing an alcohol-containing material to the reactor, wherein the alcohol-containing material is provided to the reactor in an amount of from about 1 to about 1000 mol per mol of organoaluminum material in the reactor;
    providing a ruthenium-containing metathesis catalyst to the reactor; and
    recovering a polymer from the reactor.

13. The process of claim 12, wherein the alcohol-containing material is selected from the group consisting of triisopropanolamine, 4-tert-butylcatechol, isopropanol, and phenol formaldehyde resins.

14. The process of claim 12, wherein the recovered polymer has a number average molecular weight ($M_n$) in a range of about 10,000 to about 100,000 g/mol.

15. The process of claim 12, wherein the process recovers about 60% to about 90% of the polymer by weight.

* * * * *